United States Patent

Tomoyuki

[11] 4,071,281
[45] Jan. 31, 1978

[54] FLUID PRESSURE CONTROL DEVICE FOR CROSSED PIPING BRAKE SYSTEM

[75] Inventor: Nogami Tomoyuki, Toyota, Japan

[73] Assignee: Toyota Jidosha Kogyo Kabushiki Kaisha, Toyota, Japan

[21] Appl. No.: 762,121

[22] Filed: Jan. 24, 1977

[30] Foreign Application Priority Data

July 12, 1976 Japan .................................. 51-82671

[51] Int. Cl.² .......................... B60T 8/14; B60T 17/18
[52] U.S. Cl. ................................. 303/24 A; 303/6 C; 303/84 A
[58] Field of Search ................. 303/6 C, 24 R, 24 A, 303/24 B, 24 F, 84 A, 84 R

[56] References Cited

U.S. PATENT DOCUMENTS

| | | | |
|---|---|---|---|
| 3,252,740 | 5/1966 | Stelzer | 303/24 F X |
| 3,663,067 | 5/1972 | Yabuta | 303/84 A X |
| 3,969,000 | 7/1976 | Ohta et al. | 303/84 R X |

*Primary Examiner*—Duane A. Reger
*Attorney, Agent, or Firm*—Edward W. Greason

[57] ABSTRACT

In a fluid control valve unit for a crossed piping brake system, a pair of inertia-controlled valves are provided to independently control respective braking fluids supplied to the right and left rear-wheel brake cylinders at a rate of pressure increase lower than the rate of pressure increase in a tandem master cylinder. The control valve unit is further provided therein with a movable stepped spool which is moved to forcibly close one of the inertia-controlled valves when braking fluid cannot be supplied to one of the rear-wheel brake cylinders and a stepped piston which is moved to forcibly close the other inertia-controlled valve when braking fluid cannot be supplied to the other rear-wheel brake cylinder.

7 Claims, 3 Drawing Figures

– 4,071,281 –

FLUID PRESSURE CONTROL DEVICE FOR CROSSED PIPING BRAKE SYSTEM

BACKGROUND OF THE INVENTION

The present invention relates to vehicle brake systems, and more particularly to a crossed piping brake system for a vehicle equipped with a tandem master cylinder, wherein the master cylinder pressure to be applied to the right front-wheel brake cylinder is applied to the left rear-wheel brake cylinder, while the master cylinder pressure to be applied to the left front-wheel brake cylinder is applied to the right rear-wheel brake cylinder.

SUMMARY OF THE INVENTION

The primary object of the present invention is to provide a fluid control valve unit for the crossed piping brake system, wherein even if an accident or breakage occurs within one of the fluid circuits for the respective rear-wheel brake cylinders, the front-wheel brake cylinders are surely actuated to ensure the braking operation of the vehicle.

Another object of the present invention is to provide a fluid control valve unit for the crossed piping brake system, having the above-mentioned characteristics, wherein a pair of inertia-controlled valves are provided to control respective braking fluids supplied to the rear-wheel brake cylinders at a rate of pressure increase lower than the rate of pressure increase in the tandem master cylinder.

BRIEF DESCRIPTION OF THE DRAWINGS

The above and other objects, features and attendant advantages of the present invention will be more fully appreciated as the same becomes better understood from the following detailed description in connection with the accompanying drawings in which.

DESCRIPTION OF THE PREFERRED EMBODIMENTS

Figure 1:
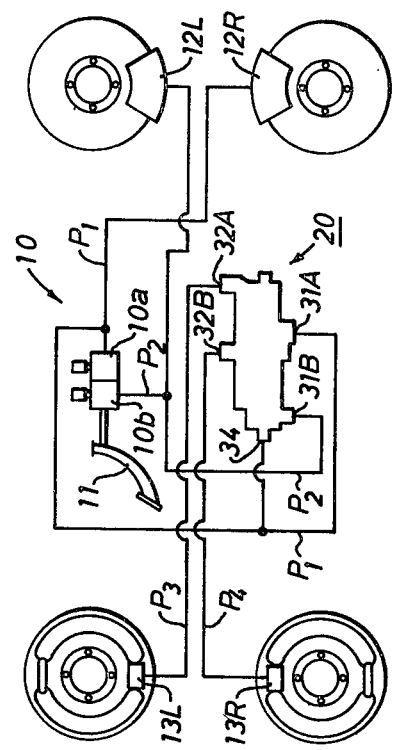
FIG. 1 is a schematic diagram of a crossed piping brake system of a vehicle, showing the installation arrangement of a preferred form of a fluid control valve unit in accordance with the present invention.

Referring now to the drawings, particularly in FIG. 1 there is schematically illustrated a vehicle braking system including a hydraulic pressure control valve unit 20 in accordance with the present invention. In the braking system, a tandem master cylinder 10 has a front pressure chamber 10a and a rear pressure chamber 10b. The front pressure chamber 10a is connected by way of a pipeline $P_1$ to a right front-wheel brake cylinder 12R and a first inlet port 31A and a bypass port 34 of the control valve unit 20, whereas the rear pressure chamber 10b is connected by way of a pipe-line $P_2$ to a left front-wheel brake cylinder 12L and a second inlet port 31B of the control valve unit 20. A left rear-wheel brake cylinder 13L is connected to a first outlet port 32A of the control valve unit 20 by way of a pipe-line $P_3$, whereas a right rear-wheel brake cylinder 13R is connected to a second outlet port 32B of the control valve unit 20 by way of a pipe-line $P_4$.

Figure 2:
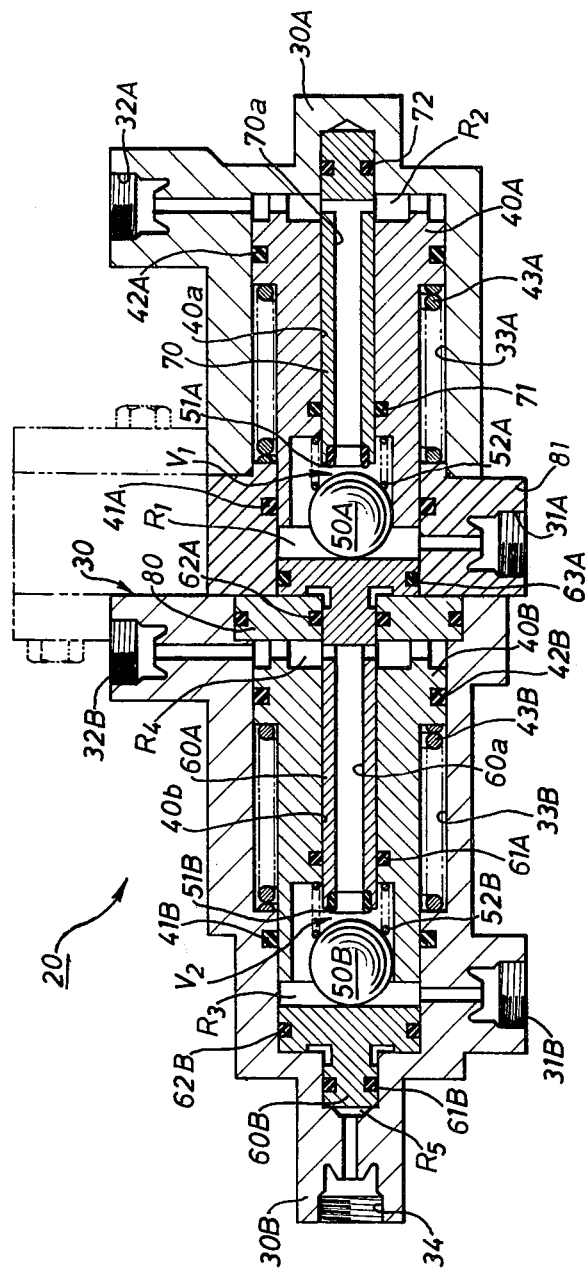
FIG. 2 is a view in longitudinal section of the control valve unit shown in FIG. 1.

As best illustrated in FIG. 2, the control valve unit 20 comprises a housing assembly 30 to be mounted on a vehicle body frame supported by a suspension system in the fore and aft direction of the vehicle. The housing assembly 30 includes a front housing 30A and a rear housing 30B which are jointed to each other by way of a partition wall member 80 and a jointing member 81. The front housing 30A is provided therein with a first stepped cylindrical bore 33A and thereon with the first inlet port 31A and the first outlet port 32A. The rear housing 30B is provided therein with a second stepped cylindrical bore 33B having three different diameter portions and provided thereon with the second inlet port 31B, the second outlet port 32B and the bypass port 34.

In the front housing 30A, a first stepped piston 40A is reciprocably engaged within the stepped cylindrical bore 33A through annular seal members 41A and 42A and normally biased toward the forward stroke end thereof by a first compression spring 43A interposed between a stepped portion of the piston 40A and an annular inner shoulder of the bore 33A. Thus, the smaller end of the piston 40A is exposed to the master cylinder pressure applied into a first pressure chamber $R_1$ from the first inlet port 31A and the larger end of the piston 40A is exposed to the braking pressure in a second pressure chamber $R_2$. The piston 40A is further provided along the axial center thereof with an inner stepped bore 40a to receive a fixed tubular spool 70 therein. The fixed spool 70 is securedly assembled at the forward end thereof with the housing body through an annular seal member 72 and is slidably engaged within the small diameter portion of the bore 40a through an annular seal member 71. The fixed spool 70 is also provided with an annular valve seat 51A at the rearward end thereof and a passage 70a to connect the first pressure chamber $R_1$ to the second pressure chamber $R_2$ through the valve seat 51A.

An inertia-controlled ball 50A located in the first pressure chamber $R_1$ is free to roll in the forward direction of the vehicle and co-operates with the valve seat 51A to provide a first cut-off valve $V_1$. The ball 50A is normally biased rearwardly by a coil spring 52A interposed between the ball 50A and the inner rear end of the piston 40A to normally open the cut-off valve $V_1$.

In the rear housing 30B, a second stepped piston 40B is reciprocably engaged within the large and medium diameter portions of the stepped bore 33B through annular seal members 41B and 42B and normally biased toward the forward stroke end thereof by a second compression spring 43B interposed between a stepped portion of the piston 40B and an annular inner shoulder of the bore 33B. Thus, the smaller end of the second piston 40B is exposed to the master cylinder pressure applied into a third pressure chamber $R_3$ from the second inlet port 31B and the larger end of the piston 40B is exposed to the braking pressure in a fourth pressure chamber $R_4$ opening to the second outlet port 32B. The second piston 40B is further provided along the axial center thereof with an inner stepped bore 40b to receive a stepped spool 60A therein. The stepped spool 60A has a small diameter portion slidably engaged within the inner bore 40b and a through hole of the partition wall member 80 through annular seal members 61A and 62A and a large diameter portion slidably engaged within the small diameter portion of the first stepped bore 33A through an annular seal member 63A. The second movable spool 60A is provided with an annular valve seat 51B at the rearward end thereof and a passage 60a to connect the third pressure chamber $R_3$ to the fourth pressure chamber $R_4$ through the valve seat 51B.

An inertia-controlled ball 50B housed in the third pressure chamber $R_3$ is free to roll in the forward direction of the vehicle and co-operates with the valve seat 51B to provide a second cut-off valve $V_2$. The ball 50B is normally biased rearwardly toward a small stepped piston 60B by a coil spring 52B, which is interposed between the inner rear end of the second piston 40B and the ball 50B to normally open the second cut-off valve $V_2$. The small stepped piston 60B is slidably engaged within the small and medium diameter portions of the second stepped bore 33B through annular seal members 61B and 62B. Thus, the smaller end of the piston 60B is arranged to be exposed to the master cylinder pressure applied into a fifth pressure chamber $R_5$ from the bypass port 34.

In operation of the braking system described above, when the brake pedal 11 is depressed to apply the brakes, master cylinder pressure is produced respectively in the front and rear chambers 10a and 10b of the master cylinder 10. The master cylinder pressure in the front chamber 10a is directly applied to the right front-wheel brake cylinder 12R and to the first inlet port 31A and the bypass port 34 of the control valve unit 20 by way of the pipe-line $P_1$. At the same time, the master cylinder pressure in the rear chamber 10b is directly to the left front-wheel brake cylinder 12L and to the second inlet port 31B of the control valve unit 20 by way of the pipe-line $P_2$. Then, the master cylinder pressure applied into the first pressure chamber $R_1$ from the first inlet port 31A is subsequently applied to the second pressure chamber $R_2$ through the opened cut-off valve $V_1$ and the passage 70a and, in turn, to the left rear-wheel brake cylinder 13L by way of the first outlet port 32A and the pipe-line $P_3$. The master cylinder pressure is also applied into the fifth pressure chamber $R_5$ from the bypass port 34. On the other hand, the master cylinder pressure applied into the third pressure chamber $R_3$ from the second inlet port 31B is applied to the right rear-wheel brake cylinder 13R by way of the opened cut-off valve $V_2$, the passage 60a, the fourth passage chamber $R_4$, the second outlet port 32B and the pipe-line $P_4$ in sequence. Thus, the vehicle will be arrested in response to the master cylinder pressure applied to the wheel brake cylinders.

In this instance, within the control valve unit 20, the stepped spool 60A is hydraulically urged to the rearward stroke end thereof owing to fluid pressure acting on the differential areas of the spool 60A and the small piston 60B is also urged to the rearward stroke end thereof owing to the differential areas of the opposite ends of the piston 60B. The first and second stepped pistons 40A and 40B are moved rearwardly due to each fluid pressure acting on the differential areas of the respective pistons against the respective biasing forces of the coil springs 52A and 52B in which energy is stored.

When the rate of deceleration caused by the application of the brakes exceeds a predetermined value, the balls 50A and 50B are moved forwardly by the inertia-moments against the respective biasing forces of the coil springs 52A and 52B so that each of the balls 50A and 50B engages each of the valve seats 51A and 51B to close each of the cut-off valves $V_1$ and $V_2$. This interrupts the respective fluid communications between the first and second pressure chambers $R_1$ and $R_2$ and, between the third and fourth pressure chambers $R_3$ and $R_4$. Thereafter, if the master cylinder pressure is increased by continued depression of the brake pedal 11, each of the stepped pistons 40A and 40B is moved forwardly due to the master cylinder pressure acting on the respective smaller ends of the pistons 40A and 40B within the first and third chambers $R_1$ and $R_3$ to increase the applied pressures trapped in the rear-wheel brake cylinders 13R and 13L by closing of the first and second cut-off valves $V_1$ and $V_2$.

If an accident of breakage occurs within the fluid circuit for the left rear-wheel brake cylinder 13L, the movable stepped spool 60A is moved forwardly by the master cylinder pressure existing in the third pressure chamber $R_3$ so that the ball 50A is forcibly urged toward the stationary valve seat 51A to instantly close the first cut-off valve $V_1$. This results in blocking of the fluid communication between the first and second pressure chambers $R_1$ and $R_2$. Thus, the master cylinder pressure is obtained in the front chamber 10a of the master cylinder 10 to ensure the braking operation of the right front-wheel brake cylinder 12R, even if the fluid circuit is damaged. In this instance, the vehicle will be arrested by the braking operations of the two front-wheel brake cylinders 12R and 12L and the right rear-wheel brake cylinder 13R. In this braking operation, the ball 50B in the third pressure chamber $R_3$ will be separated from the valve seat 51B to maintain the opening of the second cut-off valve $V_2$ so that the master cylinder pressure is directly applied to the right rear-wheel brake cylinder 13R.

If an accident or breakage occurs within the fluid circuit for the right rear-wheel brake cylinder 13R, the small piston 60B is moved forwardly by the master cylinder pressure existing in the fifth pressure chamber $R_5$ so that the ball 50B is forcibly urged toward the movable stepped spool 60A which is urged to the rearward stroke end thereof by the master cylinder pressure applied to the first pressure chamber $R_1$. This closes the second cut-off valve $V_2$ instantly to interrupt the fluid communication between the third and fourth pressure chambers $R_3$ and $R_4$. Thus, the master cylinder pressure is obtained in the rear chamber 10b of the master cylinder 10 to ensure the braking operation of the left front-wheel brake cylinder 12L, even if the fluid circuit is damaged. In this instance, the vehicle will be arrested by the braking operations of the two front-wheel brake cylinders 12R and 12L and the left rear-wheel brake cylinder 13L.

Figure 3:
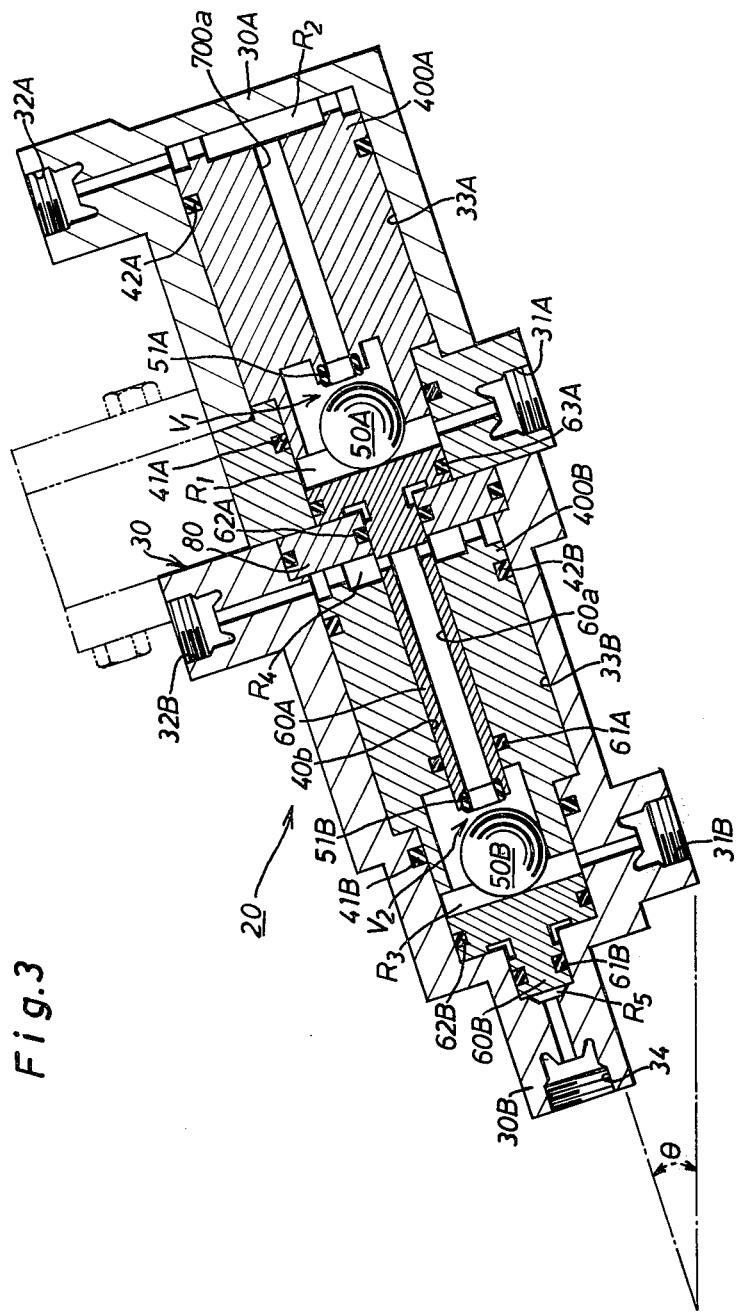
FIG. 3 is a view in longitudinal section of a modification of the control valve unit.

From the above detailed description, it will be recognized that in the preferred embodiment the stepped pistons 40A and 40B act to control the closure timing of the first and second cut-off valves $V_1$ and $V_2$ at the initial stage of the braking operation and subsequently increase the fluid pressure trapped respectively in the rear-wheel brake cylinders 13R and 13L by closing of the cut-off valves $V_1$ and $V_2$. In the case, however, when the pressure control by the cut-off valves $V_1$ and $V_2$ is only required, the stepped pistons 40A and 40B become unnecessary. In this instance, as shown in FIG. 3, the inertia-controlled balls 50A and 50B are respectively housed in the first and third pressure chambers $R_1$ and $R_3$ without the coil spring 52A and 52B and the housing assembly 30 is mounted at an inclined angle $\theta$ on the vehicle body frame such that the balls 50A and 50B rest under gravity in the respective positions shown in the figure in which the cut-off valves $V_1$ and $V_2$ are opened. Furthermore, the stepped pistons 40A and 40B are respectively replaced with support members 400A and 400B, which are fixed within the stepped bores 33A and 33B, and also the valve seat 51A is provided on the inner rear end of the support member 400A without the tubular spool 70, the passage 70a of the spool 70 being replaced with a passage 700a.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A fluid pressure control device for a brake system of a vehicle having two front wheels and two rear wheels, the system having a tandem master cylinder, a first braking fluid circuit connecting a first pressure chamber of said master cylinder to one front-wheel brake cylinder and the brake cylinder of one rear wheel diagonally opposite to said one front-wheel, and a second braking fluid circuit connecting a second pressure chamber of said master cylinder to the other front-wheel brake cylinder and the diagonally opposite other rear-wheel brake cylinder, comprising:

a housing provided thereon with first inlet and outlet ports disposed within said first fluid circuit and respectively in connection with the first pressure chamber of said master cylinder and the one rear-wheel brake cylinder, second inlet and outlet ports disposed within said second fluid circuit and respectively in connection with the second pressure chamber of said master cylinder and the other rear-wheel brake cylinder, and a bypass port in connection with the first pressure chamber of said master cylinder through said first fluid circuit, said housing being provided therein with a first bore communicating said first inlet and outlet ports to each other and a second stepped bore communicating said second inlet and outlet ports to each other and in communication with said bypass port at the small diameter portion thereof;

partition means provided between said first bore and said second stepped bore to isolate said two bores from each other;

a first valve seat provided within said first bore to permit fluid flow between said first inlet and outlet ports therethrough;

a first inertia-controlled ball housed within said first bore to co-operate with said first valve seat to cut-off communication between said first inlet and outlet ports when said ball is subjected to a deceleration in excess of a predetermined value;

a movable stepped spool slidably received by said partition means and including a larger end slidable within said first bore and a smaller end exposed within the large diameter portion of said second stepped bore, said spool being provided with a second valve seat at the smaller end thereof and a passage communicating said second inlet and outlet ports to each other through said second valve seat;

a second inertia-controlled ball housed within the large diameter portion of said second stepped bore to co-operate with said second valve seat to cut-off communication between said second inlet and outlet ports when said second ball is subjected to the said deceleration; and a stepped piston slidably disposed within the large and small diameter portions of said second stepped bore to provide a pressure chamber in communication with said bypass port, wherein the smaller end of said piston is exposed in said pressure chamber and the larger end is exposed in the large diameter portion of said second stepped bore.

2. A fluid pressure control device for a vehicle brake system having a tandem master cylinder, a first braking fluid circuit connecting a first pressure chamber of said master cylinder to the right front-wheel brake cylinder and the left rear-wheel brake cylinder, and a second braking fluid circuit connecting a second pressure chamber of said master cylinder to the left front-wheel brake cylinder and the right rear-wheel brake cylinder, comprising:

a housing provided thereon with first inlet and outlet ports disposed within said first fluid circuit and respectively in connection with the first pressure chamber of said master cylinder and the left rear-wheel brake cylinder, second inlet and outlet ports disposed within said second fluid circuit and respectively in connection with the second pressure chamber of said master cylinder and the right rear-wheel brake cylinder, and a bypass port in connection with the first pressure chamber of said master cylinder through said first fluid circuit, said housing being provided therein with a first stepped bore in communication with said first inlet and outlet ports respectively at the small and large diameter portions thereof and a second stepped bore in communication with said second inlet and outlet ports respectively at the medium and large diameter portions thereof and in communication with said bypass port at the small diameter portion thereof;

partition means provided between said first and second stepped bores to isolate said two stepped bores from each other;

a first stepped piston slidably disposed within said first stepped bore to provide first and second chambers respectively in communication with said first inlet and outlet ports, wherein the smaller end of said first piston is exposed in said first chamber and the larger end in said second chamber;

a first spring for biasing said first piston in the direction toward said first outlet port;

a first spool slidably engaged within said first stepped piston and fixed at one end thereof with the inner wall of said housing, said first spool being provided with a first valve seat exposed in said first chamber and a passage communicating said first and second chambers to each other through said first valve seat;

a first inertia-controlled ball housed within said first chamber to co-operate with said first valve seat to cut-off communication between said first and second chambers when said ball is subjected to a deceleration in excess of a predetermined value;

a second stepped piston slidably disposed within the medium and large diameter portions of said second stepped bore to provide third and fourth chambers respectively in communication with said second inlet and outlet ports, wherein the smaller end of said second piston is exposed in said third chamber and the larger end in said fourth chamber;

a second spring for biasing said second piston in the direction toward said second outlet port;

a second stepped spool slidably engaged within said partition means and said second piston and including a larger end exposed in said first chamber and a smaller end exposed in said third chamber, said second spool being provided with a second valve seat at the smaller end thereof and a passage communicating said third and fourth chambers to each other through said second valve seat;

a second inertia-controlled ball housed within said third chamber to co-operate with said second valve seat to cut-off communication between said third and fourth chambers when said second ball is subjected to the said predetermined deceleration; and a third stepped piston slidably disposed within the small and medium diameter portions of said second stepped bore to provide a fifth pressure chamber in communication with said bypass port, wherein the smaller end of said third piston is exposed in said fifth chamber and the larger end in said third chamber.

3. A fluid pressure control device as claimed in claim 2, wherein said first ball is normally biased toward the larger end of said second stepped spool by a spring engaged with the smaller end of said first piston and said second ball is normally biased toward the larger end of said third piston by a spring engaged with the smaller end of said second piston.

4. A fluid pressure control device as claimed in claim 2, wherein said first and second springs are respectively disposed within annular spaces between the large diameter portion of said first stepped bore and the small diameter portion of said first stepped piston and between the large diameter portion of said second stepped bore and the small diameter portion of said second stepped piston.

5. A fluid pressure control device for a brake system of a vehicle having two front wheels and two rear wheels, the system having a tandem master cylinder, a first braking fluid circuit connecting a first pressure chamber of said master cylinder to one front-wheel brake cylinder and the brake cylinder of one rear wheel diagonally opposite to said one front-wheel, and a second braking fluid circuit connecting a second pressure chamber of said master cylinder to the other front-wheel brake cylinder and the diagonally opposite other rear-wheel brake cylinder, comprising:

a housing provided thereon with first inlet and outlet ports disposed within said first fluid circuit and respectively in connection with the first pressure chamber of said master cylinder and the one rear-wheel brake cylinder, second inlet and outlet ports disposed within said second fluid circuit and respectively in connection with the second pressure chamber of said master cylinder and the other rear-wheel brake cylinder, and a bypass port in connection with the first pressure chamber of said master cylinder through said first fluid circuit, said housing being provided therein with a first bore communicating said first inlet and outlet ports to each other and a second bore communicating said second inlet and outlet ports to each other and in communication with said bypass port at one end thereof;

partition means provided between said first bore and said second bore to isolate said two bores from each other;

a first valve seat provided within said first bore to permit fluid flow between said first inlet and outlet ports therethrough;

a first inertia-controlled ball housed within said first bore to co-operate with said first valve seat to cut-off communication between said first inlet and outlet ports when said ball is subjected to a deceleration in excess of a predetermined value;

a movable stepped spool slidably received by said partition means and including a larger end slidable within said first bore and a smaller end exposed within said second bore, said spool being provided with a second valve seat at the smaller end thereof and a passage communicating said second inlet and outlet ports to each other through said second valve seat;

a second inertia-controlled ball housed within said second bore to co-operate with said second valve seat to cut-off communication between said second inlet and outlet ports when said second ball is subjected to the said deceleration;

a piston slidably disposed within said second bore to provide a pressure chamber in communication with said bypass port, said piston being exposed at one end thereof to said pressure chamber and at the other end thereof in the portion of said second bore communicating with said second inlet port; and means for urging said piston away from said second valve seat when the pressure on the one end of the piston is the same as the pressure on the other end of the piston.

6. A fluid pressure control device according to claim 5 wherein the means for urging said piston away from said second valve seat comprises a spring positioned between the second valve seat and the second inertia-controlled ball for biasing the ball away from the second valve seat and against the other end of said piston.

7. A fluid pressure control according to claim 5 wherein said housing is mounted on the vehicle body with the axis of the second bore inclined to the horizontal so that the other end of said piston is below the second valve seat, and the second inertia-controlled ball rests against said other end of the piston; and wherein the means for urging said piston away from said second valve seat comprises the axial component of the gravitational force acting on said second inertia-controlled ball.

* * * * *

UNITED STATES PATENT AND TRADEMARK OFFICE
CERTIFICATE OF CORRECTION

PATENT NO. : 4,071,281
DATED : January 31, 1978
INVENTOR(S) : Tomoyuki Nogami

It is certified that error appears in the above-identified patent and that said Letters Patent are hereby corrected as shown below:

Col. 3, line 43, change "passage" second occurrence, to --pressure--.

Signed and Sealed this

Twenty-sixth Day of September 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,071,281
DATED : January 31, 1978
INVENTOR(S) : Tomoyuki Nogami

It is certified that error appears in the above-identified patent and that said Letters Patent are hereby corrected as shown below:

On the first page of the patent document please correct the inventor's name from "Nogami Tomoyuki" to --Tomoyuki Nogami--.

Signed and Sealed this

Twenty-eighth Day of November 1978

[SEAL]

Attest:

RUTH C. MASON
Attesting Officer

DONALD W. BANNER
Commissioner of Patents and Trademarks